United States Patent
Gohad et al.

(10) Patent No.: US 11,775,496 B2
(45) Date of Patent: *Oct. 3, 2023

(54) DATA TRANSFER AND MANAGEMENT SYSTEM FOR IN-MEMORY DATABASE

(71) Applicant: SAP SE, Walldorf (DE)

(72) Inventors: Nilesh Gohad, Pune (IN); Adrian Dragusanu, North Vancouver (CA); Neeraj Kulkarni, Berlin (DE); Dheren Gala, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,487

(22) Filed: Jul. 18, 2022

(65) Prior Publication Data
US 2022/0350786 A1 Nov. 3, 2022

Related U.S. Application Data

(63) Continuation of application No. 16/878,894, filed on May 20, 2020, now Pat. No. 11,423,000.

(30) Foreign Application Priority Data

Apr. 2, 2020 (IN) .............................. 202011014712

(51) Int. Cl.
| | | |
|---|---|---|
| *G06F 16/22* | (2019.01) | |
| *G06F 9/54* | (2006.01) | |
| *G06F 16/2455* | (2019.01) | |
| *G06F 12/0882* | (2016.01) | |

(52) U.S. Cl.
CPC .......... *G06F 16/2282* (2019.01); *G06F 9/54* (2013.01); *G06F 12/0882* (2013.01); *G06F 16/221* (2019.01); *G06F 16/2237* (2019.01); *G06F 16/24552* (2019.01)

(58) Field of Classification Search
None
See application file for complete search history.

(56) References Cited

U.S. PATENT DOCUMENTS

| | | | | |
|---|---|---|---|---|
| 7,786,913 | B2 * | 8/2010 | Waheed | .............. H04L 27/0014 327/146 |
| 7,920,081 | B2 * | 4/2011 | Waheed | ................ H03L 7/0991 375/376 |
| 9,450,605 | B2 | 9/2016 | Faerber et al. | |
| 10,445,076 | B1 | 10/2019 | Legler | |

(Continued)

*Primary Examiner* — Kim T Nguyen
(74) *Attorney, Agent, or Firm* — Sterne, Kessler, Goldstein & Fox P.L.L.C.

(57) ABSTRACT

Various embodiments for providing a data transfer and management system are described herein. An embodiment operates by determining that data of a column is stored in a column loadable format in which all of the data of the column is moved from the disk storage location to a memory responsive to a data request. A data vector that identifies a plurality of value IDs corresponding to at least a subset of the plurality of rows of the column, is identified. A page format that provides that a portion of the data of the column across a subset of the plurality of rows is moved from the second disk storage location into the memory responsive to the data request is determined. The entries of the data vector are requested, converted from column loadable format into the page persistent format, and stored across one or more memory pages.

20 Claims, 4 Drawing Sheets

(56) References Cited

U.S. PATENT DOCUMENTS

| | | | | |
|---|---|---|---|---|
| 11,086,864 B2* | 8/2021 | Gupta | ................. | G06F 16/2453 |
| 11,138,165 B2* | 10/2021 | Horn | ................. | G06F 16/24545 |
| 11,163,766 B2* | 11/2021 | Horn | ................. | G06F 16/24534 |
| 11,176,133 B2* | 11/2021 | Horn | ................. | G06F 16/24537 |
| 11,423,000 B2* | 8/2022 | Gohad | ................. | G06F 16/2282 |
| 2008/0315928 A1* | 12/2008 | Waheed | ............. | H04L 27/0014 |
| | | | | 341/131 |
| 2009/0258025 A1* | 10/2009 | Godowski | ............... | A61P 35/02 |
| | | | | 435/373 |
| 2010/0283654 A1* | 11/2010 | Waheed | ................. | H03L 7/091 |
| | | | | 341/166 |
| 2011/0148676 A1* | 6/2011 | Waheed | ................ | G04F 10/005 |
| | | | | 341/131 |
| 2013/0127633 A1* | 5/2013 | Hershey | ................. | G06F 18/00 |
| | | | | 340/870.02 |
| 2013/0128041 A1* | 5/2013 | Hershey | ................. | G01S 7/003 |
| | | | | 348/143 |
| 2021/0311923 A1* | 10/2021 | Gohad | ...................... | G06F 9/54 |
| 2021/0326263 A1 | 10/2021 | Schulze et al. | | |
| 2021/0334257 A1 | 10/2021 | Bensberg et al. | | |
| 2021/0393689 A1* | 12/2021 | Sather | .................... | A61P 35/00 |
| 2022/0004584 A1* | 1/2022 | Yamashita | ........ | G06F 16/90328 |
| 2022/0350786 A1* | 11/2022 | Gohad | ................ | G06F 12/0882 |
| 2023/0159892 A1* | 5/2023 | Penaflor Aspuria | ........................ | |
| | | | | C12N 5/0636 |
| | | | | 435/375 |
| 2023/0178239 A1* | 6/2023 | Hause, Jr. | .............. | G16H 50/20 |
| | | | | 702/19 |
| 2023/0242624 | * | 8/2023 | Moese | ............ G01N 33/56983 |
| | | | | 424/136.1 |

* cited by examiner

DATA TRANSFER AND MANAGEMENT SYSTEM FOR IN-MEMORY DATABASE

CROSS-REFERENCE TO RELATED APPLICATION

This application is a continuation of U.S. patent application Ser. No. 16/878,894 titled "Data Transfer and Management System for In-Memory Database" to Gohad et al, filed May 20, 2020, which claims priority to is related to Indian Patent Application No. 202011014712, titled "Data Transfer And Management System For In-Memory Databases" to Gohad et al., filed Apr. 2, 2020, both of which are herein incorporated by reference in their entireties.

BACKGROUND

With the increasing accumulation and storage of data, more and more space is being required to store the data on disk storage. Accessing this data often requires moving or copying the data from disk storage to memory. However, with the cost of memory being much higher than that of disk storage, it becomes difficult and inefficient to load entire columns of data from disk storage into memory, particularly when only a small portion of the column data is actually being used or accessed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data transfer and management system for in-memory databases.

With the increasing accumulation and storage of data, more and more space is being required to store the data on disk storage. Accessing this data often requires moving or copying the data from disk storage to memory. However, with the cost of memory being much higher than that of disk storage, it becomes difficult and inefficient to load entire columns of data from disk storage into memory, particularly when only a small portion of the column data is actually being used or accessed.

Figure 1:
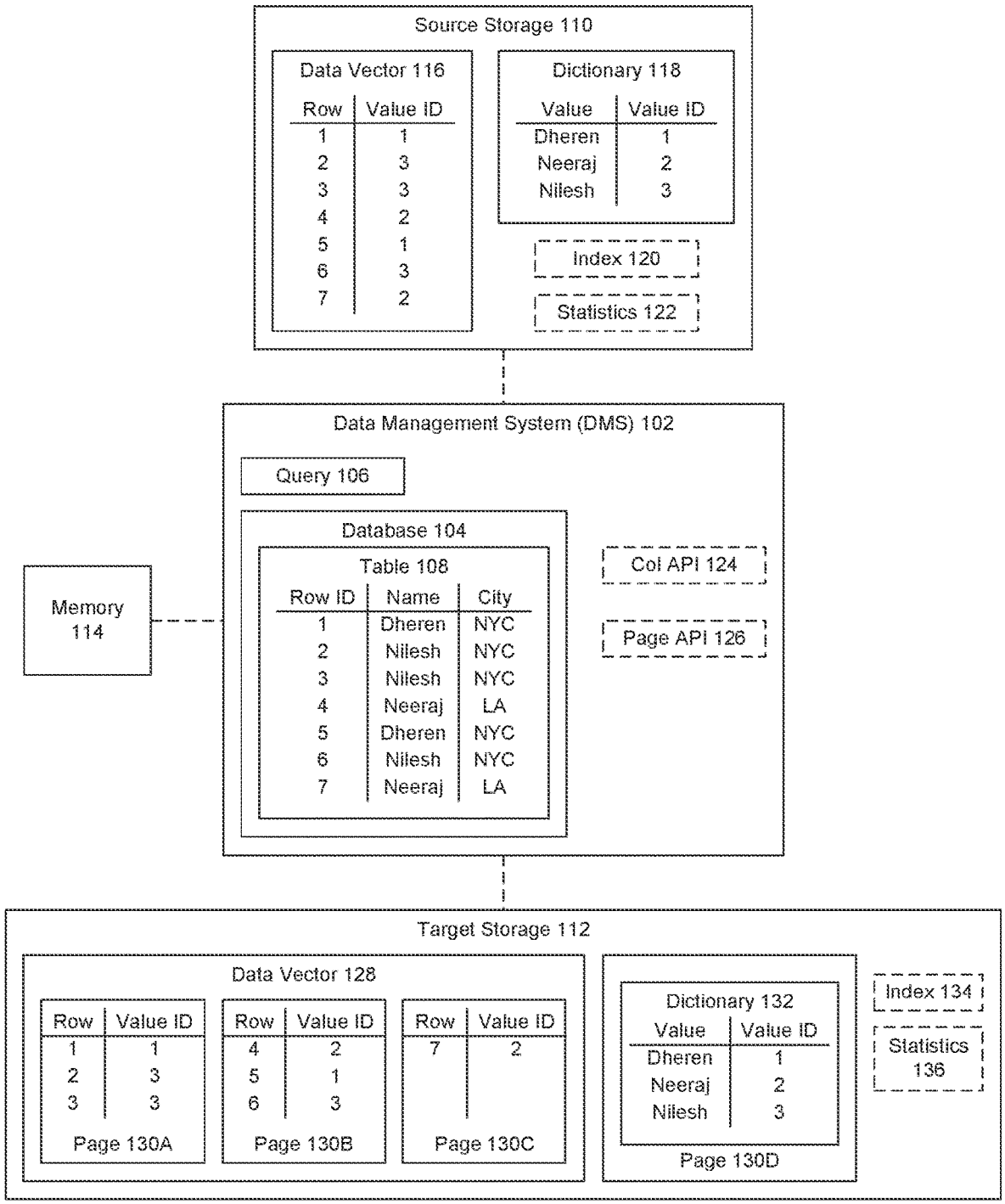
FIG. 1 is a block diagram illustrating example functionality for providing a data transfer and management system, according to some embodiments.

FIG. 1 is a block diagram 100 illustrating example functionality for providing a data transfer and management system, according to some embodiments. A data management system (DMS) 102 may perform more efficient data transfers, conversions, and management that increase or maximize available computing resources for in-memory or column-oriented databases.

DMS 102 may manage data of a database 104. Database 104 may be a column-store, in-memory database. Database 104 may include multiple different schemas and tables. For simplicity's sake, only one table 108 with three columns and seven rows is illustrated, however database 104 may include any number of tables, columns, and rows.

In an embodiment, the row ID column may represent a table attribute or a system assigned unique row identifier. Row ID may be a unique identifier that is assigned by database 104 to each row of every table 108, and may uniquely distinguish the row from all other rows of a particular table 108 or database 104. In an embodiment, row ID may remain the same for the lifetime of the row (e.g., until deleted or garbage collected) and may be used for data management purposes while remaining invisible or inaccessible to any data requesting system or user.

DMS 102 may receive a query 106. Query 106 may be a request to retrieve, modify, or otherwise access data from table 108. To process query 106, database 104 or DMS 102 may copy the table data from a disk storage location (e.g., source storage 110 or target storage 112) to memory 114. However, there may only be limited amount of memory 114 available relative to the capacity of the disk storage. As such, to perform query processing, database 104 may have to manage memory 114 effectively, copying and evicting data from one or more disk storage locations that was, is, or may be used in query and other data processing functionality.

While storing data in memory 114 may provide for faster, more efficient access to data relative to disk storage, the amount of memory available is both limited in quantity and more expensive relative to that of disk storage. As such, to manage the memory 114 efficiently, database 104 may balance between how much data is loaded into and out of memory in processing (or anticipation of processing) queries 106. Queries 106 may then be processed against in the in-memory data that is organized across various columns and rows of various tables 108.

For example, database 104 may load the city data into memory 114. However, if memory 114 is getting full and/or city data is no longer required, database 104 may then evict, garbage collect, or otherwise remove the city data from memory 114, thus freeing memory space 114 for new data to be loaded from disk storage.

In an embodiment, to reduce the memory pressure (e.g., constant writes of data into memory 114 and eviction of data from memory 114) database 104 may distinguish frequently used or hot data from less-often accessed warm or cold data. In an embodiment, a portion of this hot data may be maintained in memory 114 across processing multiple queries 106. In an embodiment, a database 104 may use various collected and maintained data statistics 122 to determine which data has been recently accessed.

In an embodiment, to more efficiently manage memory 114 functions, database 104 may enable employ two different load modes for loading the data from table 108 from disk storage into and out of memory: column load and page load. The database 104 may employ either column load or page load on a particular column, table, or schema of database 104.

In column load or column-level persistence, all of the data of a particular column may be loaded into memory when any portion of the data of the column is requested. For example, all of the data in the Name column of table 108 may be loaded into memory 114 when any data request or query 106 on the Name column is received.

While only seven rows are illustrated in the example table 108, other tables may include millions or billions of rows or records that could consume large amounts of memory 114 when loaded. In an embodiment, database 108 may use column load with data from hot columns, or when multiple distributed portions of a column may be requested or necessary for processing or data access. With column load, all of the substructures of a column (e.g., such as a data vector 116, dictionary 118, index structure 120, compression structures, etc.) are either fully loaded into or unloaded from memory 114.

Page load or page-level persistence may enable data from a table 108 to be loaded in smaller portions without requiring all of the rows be either loaded into or evicted from memory 114. For example, rather than requiring that all seven rows of table 108 be loaded into memory 114, as would be required with column load, page load may enable three rows to be loaded into memory 114.

This partial load (e.g., based on loading and evicting memory pages 130A-C) may save increasing memory resources as the amount of data in a column of table 108 grows, as only the relevant data from the column may be loaded into memory 114. While either column load or page load may be used with any column of database 104, page load may be particularly useful in loading (and evicting) portions from warm or cold columns (e.g., or any data that is not already loaded in memory 114).

In an embodiment, the unit size of page load and eviction may be that of a memory page 130A-C. A memory page (e.g., 130A-C) may be a contiguous block of memory space that is mapped to an operating system, and may include virtual memory. As such, rather than loading all of the data from all the rows (which could span multiple memory pages) into memory 114, when the data is paginated or converted to page load form, whatever subset of rows of a column that fit on a memory page in either compressed or uncompressed form may be loaded into memory 114. Similarly, only the corresponding or related portions of substructures (e.g., data vector 128, dictionary 132, index 134, compression structures, and statistics 136) related to the loaded memory page 130A-C may be loaded into memory as well.

In an embodiment, to support page loadable behavior, the data of the column needs to be stored or persisted such that, for a given attribute, database 104 is able to directly identify and load the page (e.g., 130A-C) containing the data item or value of interest without having to load or read any other unrelated pages. This may mean that page loadable format for page loadable data from table 108 is different from column loadable format of data from table 108.

To enable column load on the data of database 104, DMS 102 may convert the data of one or more columns of database 104 from the column load format to the page load format. Source storage 110 may represent a disk storage location where the data substructures of the Name column of table 108 are stored in column load format. Target storage 112 may represent a disk storage location (on a same or different device or storage location than source storage 110) where the data substructures of the Name column are stored in page load format (e.g., after conversion through or with DMS 102).

The data of the Name column from table 108 may be stored on the disk storage location of source storage 110 across a number of different substructures, a sampling of which are illustrated. In an embodiment, DMS 102 may use or leverage the functions or functionality of one or more application programming interfaces (APIs) to perform the conversion process. For example, col API 124 may be used to request or access the data stored in column load format (e.g., source storage 110), and page API 126 may be used to convert data from column load format to page load format and store the converted data on target storage 112. Each API may have its own set of callable functions that may be requested by DMS 102.

In an embodiment, page API 126 may also enable access to data stored in page load format on target storage 112. In an embodiment, page API 126 and/or col API 124 may be configured to convert data from target storage 112 in page load format to column load format and store the converted data on source storage 110. The conversion process between the column load and page load formats may be performed on the various substructures that store the column data, such as data vector 116, dictionary 118, index 120, and statistics 122. The conversion process described herein will primarily be directed to column to page load conversion, however it is understood that a similar process may be used to convert from page load format to column load format.

In an embodiment, the column data or values of database 104 may be dictionary compressed where a data dictionary 118 maps each unique value present in database 104 (or a particular table 108) for the column data to a unique integer, string, or other data type referred to as a value ID. The data may then be stored as an array or data vector 116 of such value IDs. The row or position in the vector may correspond to the dictionary-mapped value for the data in that row position of the column. For example, row 4 in the data vector 116 may include value ID 2, which from dictionary 118 corresponds to "Neeraj," which as illustrated in table 108, row ID 4 corresponds to the "Neeraj" value. In an embodiment, similar structures may be provided for other columns (e.g., city) across various other tables (not illustrated) of database 104.

In another embodiment, source storage 110 may include additional or different substructures than those illustrated. For example, data vector 116 may incorporate a compression scheme to further reduce the amount of space required to store the values of the Name column. For example, if the same value ID "3" appeared 5 consecutive times in data vector 116, then the organization of data vector 116 may include addition or different substructures that may account for this overlap or ability to compress with various compression schemes.

Similarly, if there is overlap between data values for data dictionary, compression may be used. For example, if the names were "Nick", "Nicole", and "Nice." Then compression may account for the overlapping "Nic" in each value. As such, source storage 110 may include other compression substructures for data vector 116 and/or dictionary 118 for the data of the Name column.

In an embodiment, source storage 110 may also include an index 120. Index 120 may be a data structure that improves the speed of data retrieval of values from data vector 116. For example, with millions or billions or rows of data in data vector 116, record retrieval can be slow. DMS 102 or database 104 may create index 120 to expedite record identification and/or retrieval.

Statistics 122 may include any data statistics that have been generated and/or are maintained about the data of a particular column (e.g., the Names column) of table 108. In an embodiment, statistics 122 may include the top ten most occurring vales in data vector 116, and the minimum and/or maximum values in dictionary 118. In other embodiment, other statistics may be captured and maintained. Statistics 122 may be updated as data of table 108 changes or is updated. In an embodiment, statistics 122 may be used to determine which query plan to use in processing one or more queries 106.

In an embodiment, DMS 102 may call a function of col API 124 and request a subset of entries from data vector 116 to convert to page load format. In an embodiment, DMS 102 may request 1024 entries at a time. In other embodiments, the number of requested entries may be vary and may be any meaningful number of entries that may in part depend on available system resources to perform the conversion process. While the conversion process may be performed one entry of data vector 116 at time, that would require additional overhead for each read and write. By the same token requesting a large number or too many entries at a time may consume too many system resources, which may reduce system throughput or slow down other processes which may be trying to execute.

In calling the request function from col API 124, DMS 102 may store the retrieved or requested entries from data vector 116 in memory 114. DMS 102 may then call a conversion (and/or store) function of page API 126 and provide the requested entries from memory 114 as arguments to the function.

In an embodiment, DMS 102 may provide a pointer or memory address to where requested entries are stored in memory 114 or source storage 110 as an argument in the called conversion function of page API 126. Page API 126 may then retrieve the entries and convert or paginate and store the entries across one or more memory pages 130A-C. This process of retrieving, converting, and storing may be performed over and over again until all of the entries of data vector 116 have been retrieved, converted, and stored across various memory pages 130A-C. DMS 102 may perform a native conversion process.

As illustrated, if query 106 requests data value for entry 5, rather than requiring a load of the entire data vector 116 from source storage 110, DMS 102 enables only page 130B to be loaded. In an embodiment, the last page 130C may include a paging index that indicates which entries are stored on which pages 130A-C. Then, for example, database 104 may quickly determine from the paging index that page 130A includes entries 1-3, 130B includes entries 4-6, and page 130C includes entry 7.

As discussed above, data vector 116 may include tokenized substructures that may employ one or more different types of compression. If data vector 116 includes other substructures, then DMS 102 may perform a similar process as just described with regard to data vector 116 on any other substructures. This may be performed without requiring detokenization or decompression of the data values into longer strings. As such, DMS 102 may enable any tokenization and compression from source storage 110 to remain intact throughout the retrieval, conversion, and storing or paginating process onto target storage 112. Maintaining the tokenization and compression throughout the pagination or conversion process may save resources that would otherwise be required to detokenize and/or decompress data, store the longer detokenized and/or decompressed data, and then re-tokenize and recompress the data.

A traditional non-native conversion process may require that the content of the data vector and dictionary are converted into a formatted string. These strings may then be written into a virtual file. If there were any compressions, the data values would first have to be decompressed before written to the virtual file, and any sort from the original data would be lost in the decompression and writing process. DMS 102, by contrast, preserves both the original compression and sort without the need to decompress and recompress, and without the need of any intermediate data structure such as a virtual file.

In an embodiment, DMS 102 may begin with the smallest substructure (if multiple compression or other substructures are present) and continue converting all of the entries and values until all of the substructures including or supporting data vector 116, are paginated and stored on target storage 112.

DMS 102 may copy or convert the dictionary 118 from source storage 110 to target storage 112 as dictionary 132. In an embodiment, the conversion of dictionary 118 may be performed one entry at a time, thus maintaining any sort on the values of dictionary 118. For example, the values of dictionary 118 may be stored in ascending or descending order so that value lookups may be performed quickly. As described above, DMS 102 may convert entries across the substructures data vector 116, dictionary 18, index 120, and statistics 122 without first detokenizing and/or decompressing the values of each entry back into their original table 108 row values.

The values of dictionary 132, when converted, may be stored across multiple pages 130D, and metadata about which values are stored on each page may be maintained. With large numbers of unique value entries, millions or billions, the conversion process by DMS 102 eliminates the need to either decompress and recompress or re-sort the converted dictionary 132 values, thus saving resources.

In an embodiment, DMS 102 may perform similar processes as described above with respect to converting index 120 from column format into index 134 in page format. As referenced above, index 134 may be stored across one or more pages 130A-C and may reference the values in the pages 130A-C. In an embodiment, DMS 102 may copy the statistics 122 from source storage 110 to statistics 136 on target storage and update the references to any values as to where they are stored in pages 130A-C.

Figure 2:
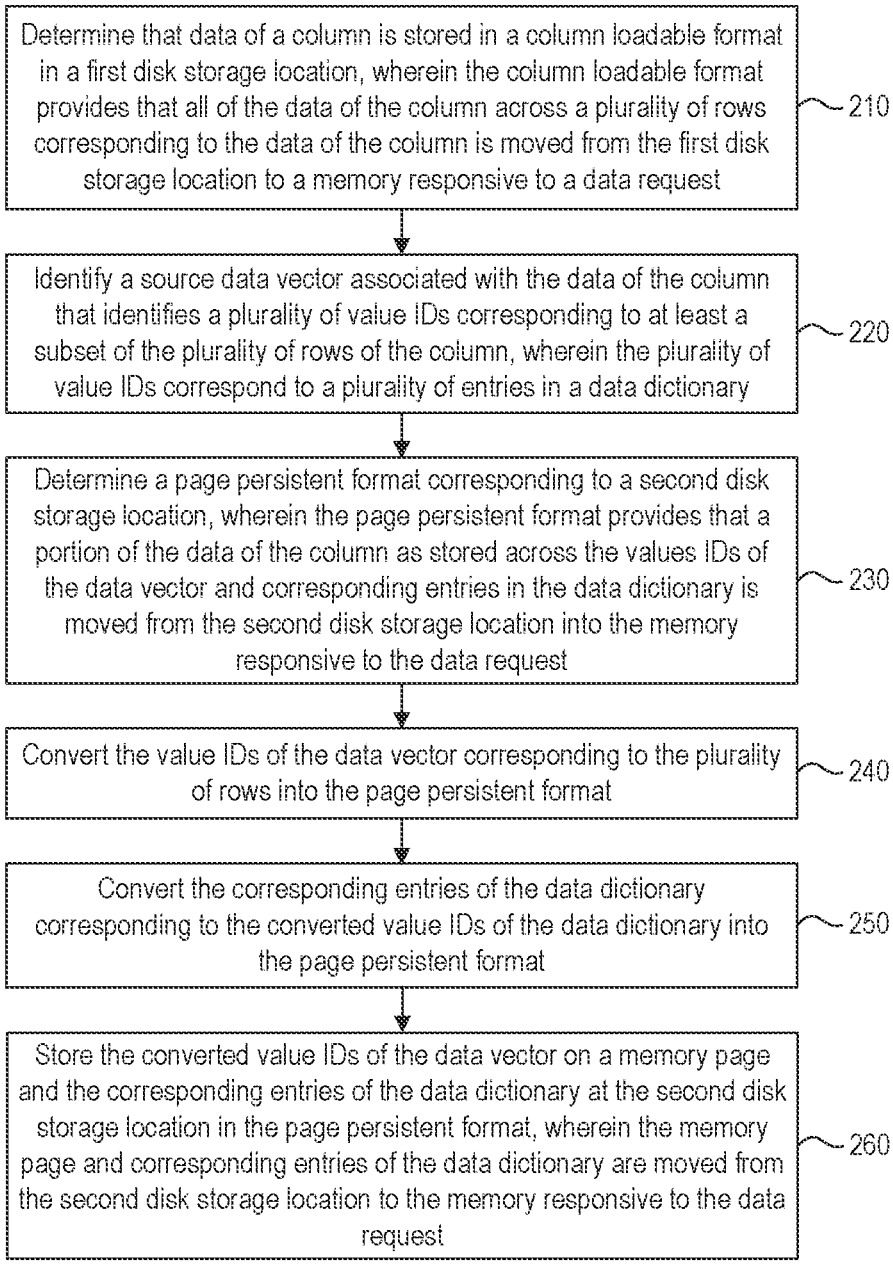
FIG. 2 is a flowchart illustrating example operations for providing a data transfer and management system, according to some embodiments.

FIG. 2 is a flowchart 200 illustrating example operations for providing a data transfer and management system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1.

In 210, it is determined that data of a column is stored in a column loadable format in a first disk storage location, wherein the column loadable format provides that all of the data of the column across a plurality of rows corresponding to the data of the column is moved from the first disk storage location to a memory responsive to a data request. For example, the data of the Name column of table 108 may be stored in a source storage 110 across various subcomponents such as a data vector 116 and dictionary 118. The data vector 116 may be arranged into a column load format, such that responsive to a query 106, all of the data of the Name column is loaded into memory 114. Then, for example, when the data is no longer required, all of the data of the Name column is evicted from memory 114.

In 220, a source data vector associated with data of the column that identifies a plurality of value IDs corresponding to at least a subset of the plurality of rows of the column is identified, wherein the plurality of value IDs correspond to a plurality of entries in a data dictionary. For example, DMS 102 may determine that the values of the Name column may be stored in a data vector 116. Data vector 116 may include a row numbers or row identifiers (ID) and corresponding value identifiers (IDs). The value ID may correspond to an entry in a data dictionary 118.

In 230, a page persistent format corresponding to a second disk storage location is determined, wherein the page persistent format provides that a portion of the data of the column stored across the value IDs of the data vector and corresponding entries of the data dictionary is moved from the second disk storage location into the memory responsive to the data request. For example, DMS 102 may determine that the data (e.g., from data vector 116 and data dictionary 118) of source storage 110 is to be converted to a page load format and stored in a target storage 112. The page load format may enable single the values from single data pages 130A-C to be loaded into and evicted from memory 114.

In 240, the values IDs of the data vector corresponding to the plurality of rows is converted into the page persistent format. For example, DMS 102 may call a function of page API 126 to request that entries from data vector 116 are converted or paginated across one or more memory pages 130A-C.

In 250, the corresponding entries of the data dictionary corresponding to the converted value IDs are converted into the page persistent format. For example, DMS 102 may call a function of page API 126 to convert the entries in dictionary 118 in page persistent format. In an embodiment, all of the values of dictionary 118 may be converted. In an embodiment, the converted values of dictionary 132 may be stored across one or more pages 130D.

In 260, the converted value IDs of the data vector are stored on a memory page and the corresponding entries of the data dictionary are stored at the second disk storage location in the page persistent format, wherein the memory page is moved from the second disk storage location to the memory responsive to the data request. For example, DMS 102 may call a function that stores the converted or divided entries of data vector 116 so that they are stored or paginated across one or more memory pages 130A-C. The converted data dictionary 132 may also be stored on target storage 112. In an embodiment, the compression used in source storage 110 may be maintained in target storage 112.

In an embodiment, DMS 102 may repeat the requesting, convertings, and storage processes until all of the entries of data vector 116 are converted and stored on target storage 112 across data pages 130A-C. In an embodiment, DMS 102 may be configured to reverse this process, and convert data vector 128 back into or into a column-only load data vector 116. For example, if the data of a particular column goes from warm/cold to hot, DMS 102 may convert the data back to column load data.

Figure 4:
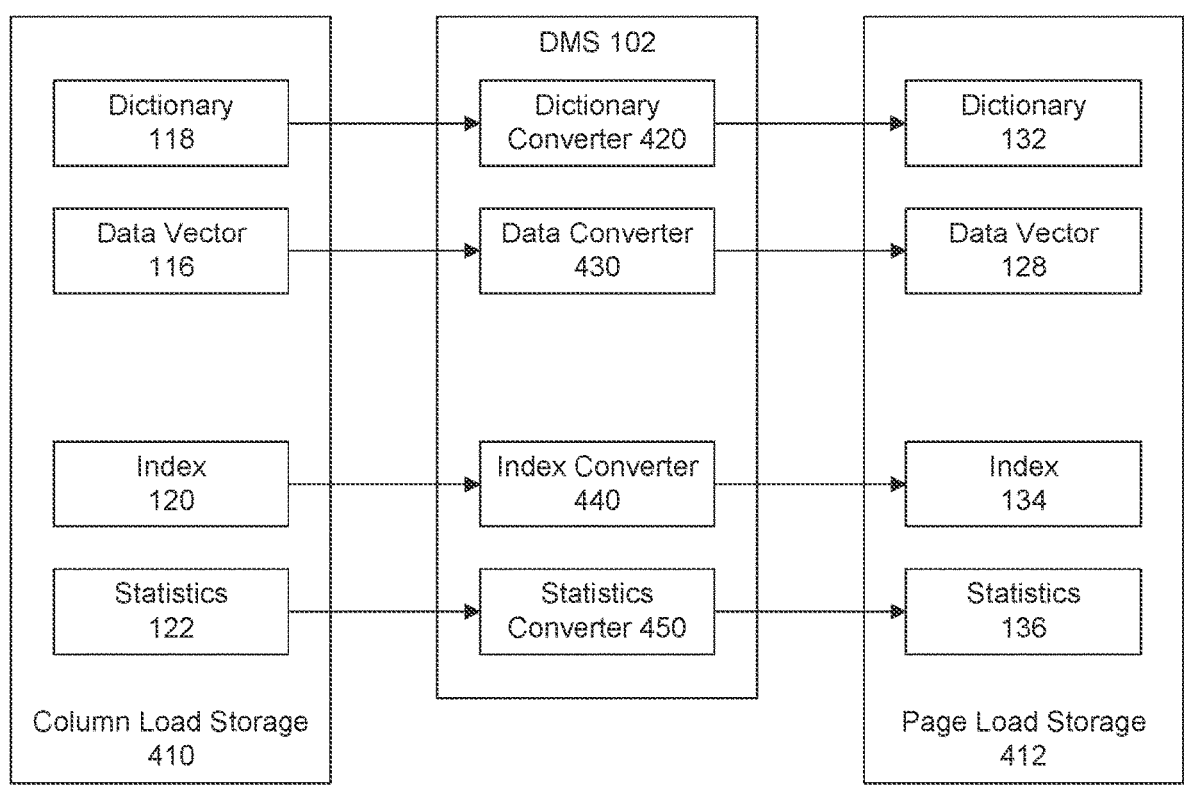
FIG. 4 is another block diagram illustrating example functionality for providing a data transfer and management system, according to some embodiments.

FIG. 4 is another block diagram 400 illustrating example functionality for providing a data transfer and management system (DMS) 102, according to some embodiments. DMS 102 may include or be distributed across various processors 420, 430, 440, and 450 that perform the conversion processes described herein.

For example, data for at least a subset of rows of a table (e.g., 108) may be stored in a column load storage 410 (which may correspond to a source storage 110), across a variety of subcomponents, including dictionary 118, data vector 116, index 120, and statistics 122. DMS 102 may perform conversions and store the converted subcomponents on page load storage 412 (which may correspond to target storage 112).

The various components of DMS 102 may then each, independently, serially or in parallel perform the conversions from column load forma to page load format (or vice versa). For example, a dictionary converter 420 may convert the entries from dictionary 118 into the entries for dictionary 132.

A data converter 430 may convert the data vector 116 into the data vector 128, stored across multiple memory pages (e.g., 130A-B). An index converter 440 may convert index 120 into index 134, and statistics converter 450 may convert statistics 122 into statistics 136. This separation of conversion processes may enable the conversion from column load to page load (or vice versa) without detokenizing or decompressing the entries in any of the substructures (118, 116, 120, 122) as part of the conversion process.

Figure 3:
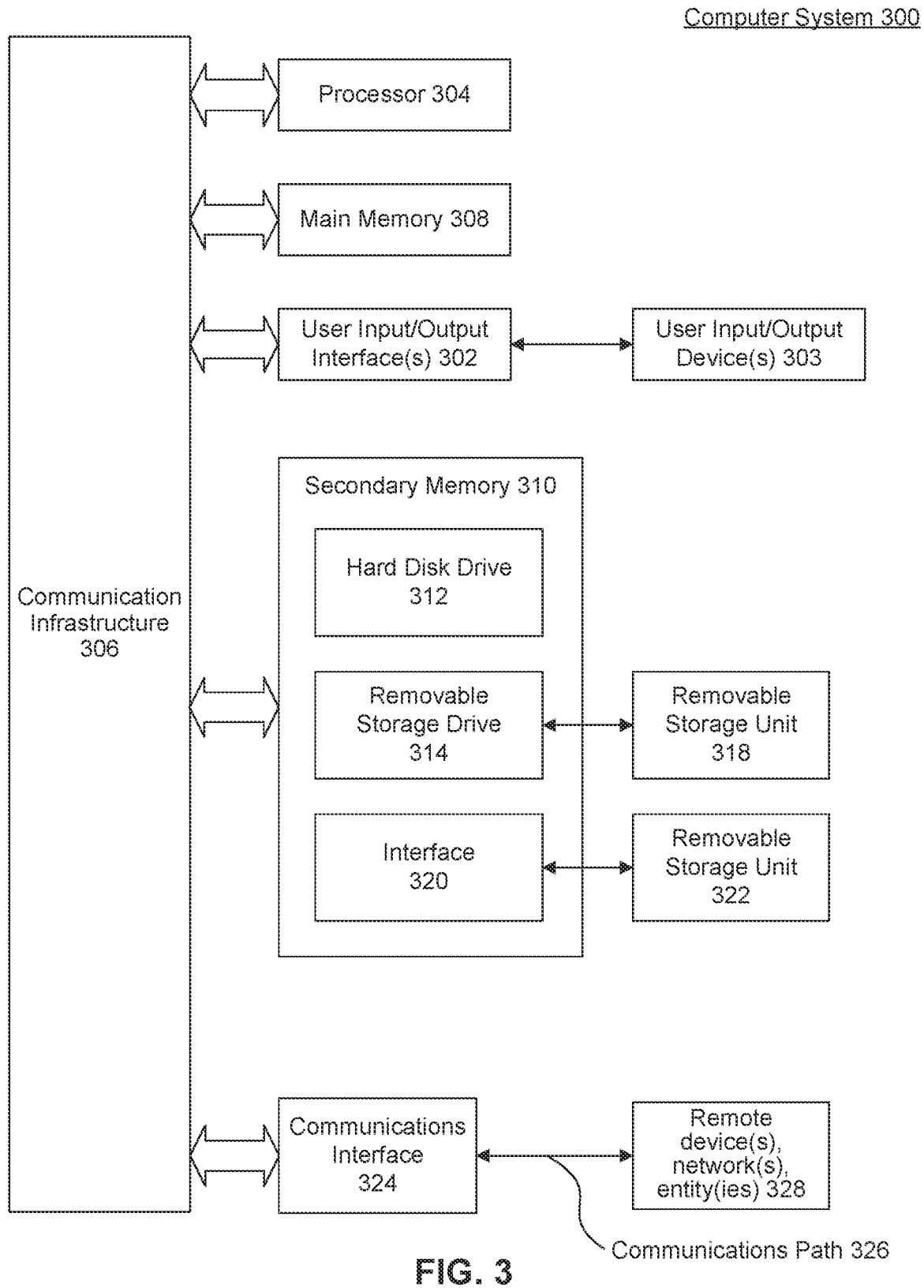
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method comprising:
   determining that data of a column is stored in a column loadable format in a first disk storage location, wherein the column loadable format provides that all of the data of the column across a plurality of rows corresponding to the data of the column is moved from the first disk storage location to a memory responsive to a data request;

identifying a source data vector associated with the data of the column that identifies a plurality of value IDs corresponding to at least a subset of the plurality of rows of the column;

determining a page persistent format corresponding to a second disk storage location, wherein the page persistent format provides that a portion of the data of the column as stored across the value IDs of the source data vector is moved from the second disk storage location into the memory responsive to the data request;

converting the value IDs of the source data vector corresponding to the plurality of rows into the page persistent format; and storing the converted value IDs of the source data vector on a memory page at the second disk storage location in the page persistent format, wherein the memory page is moved from the second disk storage location to the memory responsive to the data request.

2. The method of claim 1, wherein the column is part of a table of an in-memory database.

3. The method of claim 1, further comprising:
repeating the converting the value IDs and the storing until all of the plurality of rows of the column, corresponding to entries in the source data vector, are stored across a plurality of memory pages at the second disk storage location in the page persistent format.

4. The method of claim 1, wherein the data request comprises:
calling a function of a source application programming interface (API) corresponding to the column loadable format, wherein the function of the source API is configured to retrieve a subset of entries from the source data vector, corresponding to the plurality of rows of the column, from the first disk storage location.

5. The method of claim 4, wherein the converting comprises:
calling a function of a target API corresponding to the page persistent format, wherein the function of the target API is configured to convert requested entries from the source data vector, corresponding to the subset of the plurality of rows, from the column loadable format into the page persistent format.

6. The method of claim 5, further comprising:
identifying an index for the source data vector;
requesting a plurality of entries from the index; and
calling the function of the target API that is configured to convert the requested plurality of entries from the index from the column loadable format into the page persistent format.

7. The method of claim 1, wherein the plurality of value IDs correspond to a plurality of entries in a data dictionary.

8. The method of claim 1, wherein a plurality of entries stored on the source data vector are compressed.

9. A system comprising:
a memory; and
at least one processor coupled to the memory and configured to perform operations comprising:
determining that data of a column is stored in a column loadable format in a first disk storage location, wherein the column loadable format provides that all of the data of the column across a plurality of rows corresponding to the data of the column is moved from the first disk storage location to a memory responsive to a data request;

identifying a source data vector associated with the data of the column that identifies a plurality of value IDs corresponding to at least a subset of the plurality of rows of the column;

determining a page persistent format corresponding to a second disk storage location, wherein the page persistent format provides that a portion of the data of the column as stored across the value IDs of the source data vector is moved from the second disk storage location into the memory responsive to the data request;

converting the value IDs of the source data vector corresponding to the plurality rows into the page persistent format; and storing the converted value IDs of the source data vector on a memory page at the second disk storage location in the page persistent format, wherein the memory page is moved from the second disk storage location to the memory responsive to the data request.

10. The system of claim 9, wherein the column is part of a table of an in-memory database.

11. The system of claim 9, the operations further comprising:
repeating the converting the value IDs, and the storing until all of the plurality of rows of the column, corresponding to entries in the source data vector, are stored across a plurality of memory pages at the second disk storage location in the page persistent format.

12. The system of claim 9, wherein the data request comprises:
calling a function of a source application programming interface (API) corresponding to the column loadable format, wherein the function of the source API is configured to retrieve a subset of entries from the source data vector, corresponding to the plurality of rows of the column, from the first disk storage location.

13. The system of claim 12, wherein the converting comprises:
calling a function of a target API corresponding to the page persistent format, wherein the function of the target API is configured to convert requested entries from the source data vector, corresponding to the subset of the plurality of rows, from the column loadable format into the page persistent format.

14. The system of claim 13, the operations further comprising:
identifying an index for the source data vector;
requesting a plurality of entries from the index; and
calling the function of the target API that is configured to convert the requested plurality of entries from the index from the column loadable format into the page persistent format.

15. The system of claim 9, wherein the plurality of value IDs correspond to a plurality of entries in a data dictionary.

16. The system of claim 9, wherein a plurality of entries stored on the source data vector are compressed.

17. A non-transitory computer-readable device having instructions stored thereon that, when executed by at least one computing device, cause the at least one computing device to perform operations comprising:
determining that data of a column is stored in a column loadable format in a first disk storage location, wherein the column loadable format provides that all of the data of the column across a plurality of rows corresponding to the data of the column is moved from the first disk storage location to a memory responsive to a data request;

identifying a source data vector associated with the data of the column that identifies a plurality of value IDs corresponding to at least a subset of the plurality of rows of the column;

determining a page persistent format corresponding to a second disk storage location, wherein the page persistent format provides that a portion of the data of the column as stored across the value IDs of the source data vector is moved from the second disk storage location into the memory responsive to the data request;

converting the value IDs of the source data vector corresponding to the plurality of rows into the page persistent format; and storing the converted value IDs of the source data vector on a memory page at the second disk storage location in the page persistent format, wherein the memory page is moved from the second disk storage location to the memory responsive to the data request.

18. The device of claim 17, wherein the column is part of a table of an in-memory database.

19. The device of claim 17, the operations further comprising:

repeating the converting the value IDs, and the storing until all of the plurality of rows of the column, corresponding to entries in the source data vector, are stored across a plurality of memory pages at the second disk storage location in the page persistent format.

20. The device of claim 17, the data request comprises:

calling a function of a source application programming interface (API) corresponding to the column loadable format, wherein the function is configured to retrieve a subset of entries from the source data vector, corresponding to the plurality of rows of the column, from the first disk storage location.

* * * * *